United States Patent

[11] 3,597,118

| [72] | Inventor | Erwin Kolfertz<br>Turnerstrasse 22, Solingen-Merscheid, Germany |
|---|---|---|
| [21] | Appl. No. | 815,403 |
| [22] | Filed | Apr. 11, 1969 |
| [45] | Patented | Aug. 3, 1971 |
| [32] | Priority | May 28, 1968 |
| [33] | | Germany |
| [31] | | P 17 03 482.1 |

[54] AQUARIUM PUMPS
6 Claims, 3 Drawing Figs.

[52] U.S. Cl. ............................................. 417/360
[51] Int. Cl. ............................................. F04b 17/00
[50] Field of Search ............................. 230/55;
103/53 A, 53, 111 F, 87 M; 310/18; 43/57;
210/169; 417/360, 413

[56] References Cited
UNITED STATES PATENTS

| 2,942,772 | 6/1960 | Buchanan | 417/413 |
| 3,066,611 | 12/1962 | Schwartmann et al. | 417/413 |
| 2,963,978 | 12/1960 | Namur | 103/111 X |
| 3,266,716 | 8/1966 | Tussey | 230/55 |
| 3,392,836 | 7/1968 | Willinger | 210/169 |

*Primary Examiner*—Robert M. Walker
*Attorneys*—Curt M. Avery, Arthur E. Wilfond, Herbert L. Lerner and Daniel J. Tick

ABSTRACT: An aquarium pump comprises a pump part and an electrical energizing coil, which operates the pump part, contained in a housing consisting of at least two separable housing parts. The pump part is mounted on one housing part and the energizing coil on the other housing part and they come into operative relationship with each other on assembling the housing parts together so that if either the pump part or the coil fails they can be replaced individually by replacing the appropriate housing part.

Patented Aug. 3, 1971

AQUARIUM PUMPS

This invention relates to pumps for use in aerating water in aquariums, comprising a housing having a number of parts which can be separated from each other and which accommodate a pump part and an electrical energizing device for driving the pump part.

Pumps for aquariums are known in which the separable housing parts consist of a housing body and a cover, or bottom plate, which acts as a closure for the housing body. In these pumps both the pump part and the electrical driving mechanism are attached to the housing body. This has the disadvantage that when a fault occurs in the pump part or in the electrical energizing device the entire pump has to be discarded and a new pump obtained, or the entire pump has to be sent in for repairs. In either case the aquarium operator has to buy a new pump, in order to sustain the oxygen supply to his aquarium. Thus, as soon as the slightest damage occurs either to the pump part or to the electrical energizing device an entire replacement pump has to be obtained, which is a costly matter.

The object of the present invention is to provide an aquarium pump, which is free from the disadvantages mentioned above, and which allows the oxygen supply to the aquarium to be sustained, in the event of damage occurring to the pump part or to the electrical energizing device of the pump, without it being necessary to purchase an entire new pump.

According to this invention, in an aquarium pump comprising a housing having a number of parts which can be separated from each other and which accommodate a pump part and an electrical energizing device for driving the pump part, the pump part is attached to one housing part and the electrical energizing device is attached to another housing part so that either the pump part or the electrical energizing device can be replaced individually by replacing the appropriate housing part.

What is obtained in this way is that in the event of damage occurring for example to the pump part, only the one housing part need be replaced, this being the housing part which has the pump part attached to it, and this is of course less costly than replacing the entire pump. On the other hand if the electrical device fails, then it is only the housing part having the electrical device attached to it which has to be replaced. A further advantage which results from this arrangement is that in the course of time the aquarium operator acquires several reserve parts in good operating condition, which he can easily use as replacements for damaged parts. Under these circumstances the aquarium operator will naturally continue to buy pumps of the same type, because he knows that in the vent of trouble he already possesses the necessary replacement parts.

The pump part may be attached to a cover part of the housing and the electrical device is then attached to a body part of the housing.

For easy separation and assembly of the housing body parts, they are preferably connected together by a sliding connection. This connection may consist of external ribs on the sidewalls of one body part and corresponding rooves in the other body part to receive the ribs.

The ribs and grooves preferably extend at right angles to a cover part of the housing. This arrangement allows the two housing body parts to be separated from each other easily, after removing the cover.

The housing cover can extend to form a complete closure for both the housing body parts, or alternatively it can form a closure for only one housing body part, and fit into another housing part, which is of approximately the same height.

Two examples of aquarium pumps in accordance with the invention will now be described with reference to the accompanying drawings, in which.

Figure 1:
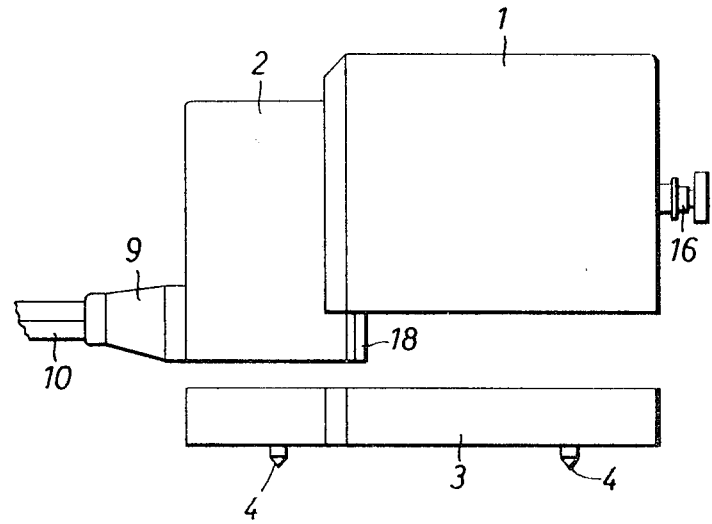
FIG. 1 is a side view of the first example with the housing cover removed and the body part of the housing containing the electrical device partly removed.
Figure 2:
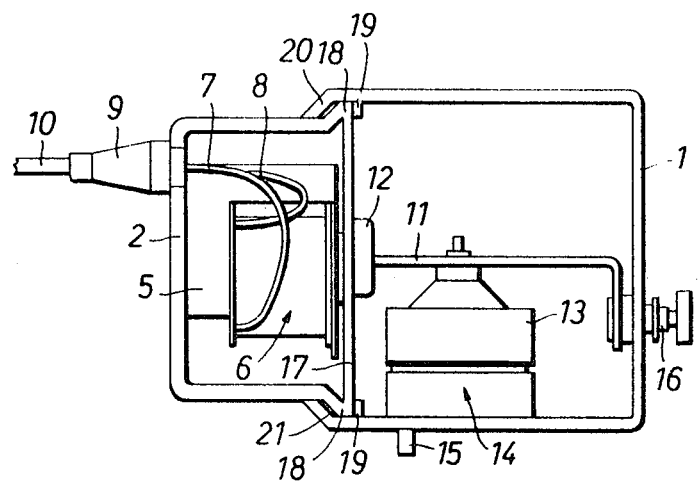
FIG. 2 is an underneath plan of the first example with the cover removed.

In the example shown in FIGS. 1 and 2 the aquarium pump comprises two housing body parts 1 and 2, and a cover 3 which closes the two parts 1 and 2. The cover can be attached to the body parts by means of screws, which are not shown in the drawings. The pump can be suspended by means of the cover 3, or it can if desired be placed upon a flat support, so that it stands on rubber feet 4 fixed on the outer surface of the cover.

As will be seen particularly from FIG. 2, the body part 2 contains an electric energizing coil 6 mounted on several U-shaped plates 5. The coil 6 is connected through electric leads 7 and 8 and a cable 10 attached by a sleeve 9 to the outer wall of the body part 2, to a source of alternating current which is not shown in the drawing. The coil 6 cooperates with an armature 11 which has, mounted on its end near the coil 6, an armature head 12 contained an embedded magnet. When alternating current is supplied through the cable 10 the armature 11 is given an oscillating movement by the coil 6, in synchronization with the frequency of the alternating current. A diaphragm 13, attached to the armature 11, imparts the oscillation to a pump part 14 which is mounted on the housing body part 1. The pump produces a current of air which is conveyed through a connection 15 and through a tube, not shown in the drawing, to the adjacent aquarium. The other end of the armature 11, furthest from the coil 6, is bent through 90 and attached to the housing by an adjustment screw 16. Manipulation of the adjustment screw 16 changes the length of stroke of the oscillating armature 11. The arrangement provides a simple method for adjusting the rate of delivery of air from the pump 14.

The two housing body parts 1 and 2 are entirely open towards each other except for a stiffening bar 17 extending across the lower part of the body part 2. The inner edge of the body part 2 has at each side a projecting rib 18 which engages between two ribs 19 and 20 of the body part 1, which together form a guiding groove 21. This arrangement allows the housing part 2 to be slid easily into and out of engagement with the housing part 1. In addition to the ribs 18, 19, 20 for guiding the sidewalls of the housing parts 1 and 2, there are similar ribs in the tops of the body parts.

In the event of damage occurring to the electrical energizing coil contained in the body part 2, resulting in failure of the pump, all that is necessary is to remove the cover 3 and withdraw the body part 2 from the body part 1. A replacement body part 2 containing a new coil 6 can then be installed. As soon as the cover 3 has been replaced, the pump is ready for operation again. On the other hand in the event of damage to the pump part 4, or to the armature 11, the body part 1 can easily be replaced with the parts which it contains. The advantage obtained in this way is that the damaged part can be replaced, instead of replacing the entire pump.

Figure 3:
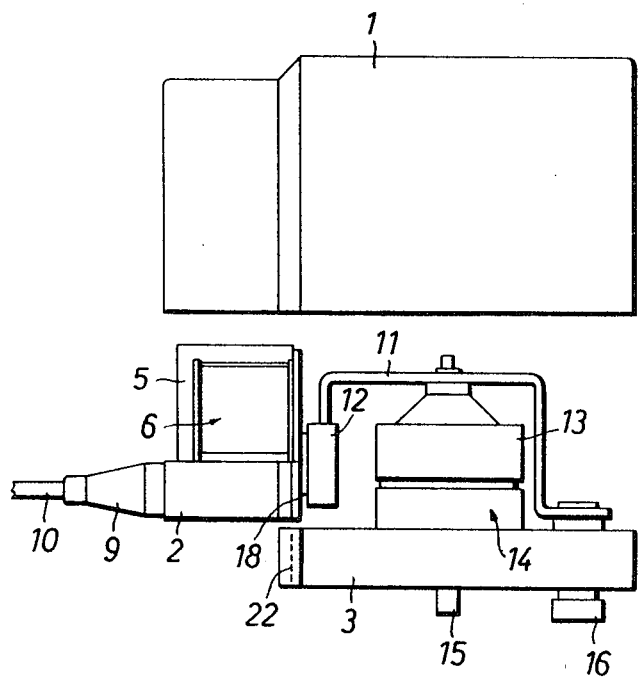
FIG. 3 is a side view of the second example with the body part of the housing removed from the cover and the pump and electrical energizing device.

In the example shown in FIG. 3 the same symbols have been used for corresponding parts. The example shown in FIG. 3 differs from that shown in FIGS. 1 and 2 essentially in that the pump part 14 is mounted on the cover 3, the coil 6 being attached to a housing part 2. To assemble the pump, the housing part 2, together with the cover 3, which contains a plug connection 22, is inserted into the housing body part 1. Here again in the event of damage occurring either to the cover 3 with its pump part 14, or to the housing part 2 with its attached coil 6, all that is necessary is to replace the damaged part.

As alternatives to the examples shown the pump part 14 can if desired be mounted on the housing part 2, the electrical coil 6 being mounted either on the housing part 1 or on the cover 3. Finally, the method of connecting the two housing parts together can be modified.

I claim:

1. In an aquarium pump including a housing comprising a plurality of housing parts and means detachably fixing said parts to each other, pump means and electrical energizing means for said pump means, the improvement comprising means mounting said pump means to one of said housing parts and means mounting said electrical energizing means to another of said housing parts, said housing parts including two body parts, and said detachable fixing means including means slidingly connecting said body parts.

2. A pump as claimed in claim 1, wherein said housing parts also include a cover part, and said mounting means mounts said pump means to said cover part and said energizing means to one of said body parts.

3. A pump as claimed in claim 1, wherein said means slidingly connecting said body parts includes external ribs on one of said body parts and means defining grooves on the other of said body parts, said grooves being adapted to receive said ribs in mating engagement.

4. A pump as claimed in claim 3, wherein said housing parts further include a cover part and said ribs and said grooves extend at right angles to said cover part.

5. In an aquarium pump including a housing comprising a plurality of housing parts and means detachably fixing said parts to each other, pump means and electrical energizing means for said pump means, the improvement comprising means mounting said pump means to one of said housing parts and means mounting said electrical energizing means to another of said housing parts, said housing parts including two body parts and a cover part, said cover part forming a closure for both of said body parts, and said detachable fixing means including interfitting means on said cover part and on both said body parts.

6. In an aquarium pump including a housing comprising a plurality of housing parts and means detachably fixing said parts to each other, pump means and electrical energizing means for said pump means, the improvement comprising means mounting said pump means to one of said housing parts and means mounting said electrical energizing means to another of said housing parts, said housing parts including two body parts and a cover part, said cover part forming a closure for one of said body parts and said detachable fixing means including interfitting means on said cover part and on the other of said body parts.